United States Patent
Sinusas et al.

(10) Patent No.: US 11,459,085 B2
(45) Date of Patent: Oct. 4, 2022

(54) ENERGY ATTENUATION STABILIZERS AND METHODS

(71) Applicant: Bell Helicopter Textron Inc., Fort Worth, TX (US)

(72) Inventors: Eric Sinusas, Southlake, TX (US); Guillaume Noiseux-Boucher, Mirabel (CA); Olivier Boisvert, Mirabel (CA); Nicolas Doyon, Montreal (CA); Sebastien Duval, Terrebonne (CA)

(73) Assignee: TEXTRON INNOVATIONS INC., Providence, RI (US)

( * ) Notice: Subject to any disclaimer, the term of this patent is extended or adjusted under 35 U.S.C. 154(b) by 129 days.

(21) Appl. No.: 16/399,936

(22) Filed: Apr. 30, 2019

(65) Prior Publication Data

US 2020/0346737 A1    Nov. 5, 2020

(51) Int. Cl.
*B64C 5/02*    (2006.01)
*B64F 5/10*    (2017.01)

(52) U.S. Cl.
CPC . *B64C 5/02* (2013.01); *B64F 5/10* (2017.01)

(58) Field of Classification Search
CPC ....... B64C 11/205; B64C 11/26; B64C 1/062; B64C 2001/0072; B64C 3/20; B64C 5/02; B64C 7/00; B64C 3/28; B64F 5/10; F01D 21/045; Y02T 50/40; Y02T 50/60
See application file for complete search history.

(56) References Cited

U.S. PATENT DOCUMENTS

| | | | | | |
|---|---|---|---|---|---|
| 1,749,293 | A | * | 3/1930 | Marston | B64C 3/187 52/84 |
| 1,781,160 | A | * | 11/1930 | Carns | B64C 3/00 244/123.14 |
| 1,887,627 | A | * | 11/1932 | Finger | B64C 1/06 244/123.12 |
| 1,956,823 | A | * | 5/1934 | Carns | B64C 3/00 244/123.4 |
| 1,988,085 | A | * | 1/1935 | Orlando | F16B 5/0048 244/131 |
| 2,372,510 | A | * | 3/1945 | Mitchell | B64C 3/00 244/123.2 |
| 4,051,289 | A | * | 9/1977 | Adamson | B29C 70/08 428/113 |
| 4,302,155 | A | * | 11/1981 | Grimes | B64C 11/26 416/144 |
| 4,535,958 | A | * | 8/1985 | Hutchison | B64C 3/18 244/123.8 |
| 4,538,780 | A | * | 9/1985 | Roe | B64C 3/20 244/123.5 |

(Continued)

OTHER PUBLICATIONS

Laurent Wahl et al.; Date: Oct. 2011; Shear Stresses in Honeycomb Sandwich Plates: Analytical Solution; FEM and Experimental Verification; University of Luxembourg Oct. 2011; pp. 12 and 17.*

*Primary Examiner* — Medhat Badawi
(74) *Attorney, Agent, or Firm* — Pramudji Law Group PLLC; Ari Pramudji

(57) ABSTRACT

According to one implementation of the present disclosure, a stabilizer of an aircraft includes an energy attenuating portion. The energy attenuating portion includes first and second edge sections separated by an adaptable section. The adaptable section may be rigid in a first range of directions and compressible in a second range of directions.

12 Claims, 13 Drawing Sheets

(56) References Cited

U.S. PATENT DOCUMENTS

| | | | | |
|---|---|---|---|---|
| 4,557,961 | A * | 12/1985 | Gorges | B32B 3/12 428/117 |
| 4,565,595 | A * | 1/1986 | Whitener | B29D 99/0003 156/156 |
| 4,662,587 | A * | 5/1987 | Whitener | B29D 99/0003 244/117 R |
| 4,687,162 | A * | 8/1987 | Johnson | B64C 9/24 244/213 |
| 4,687,691 | A * | 8/1987 | Kay | B29C 44/1266 428/73 |
| 4,962,904 | A * | 10/1990 | Perry | B29C 70/845 244/131 |
| 5,216,799 | A * | 6/1993 | Charnock | B64C 3/18 244/133 |
| 5,332,178 | A * | 7/1994 | Williams | B64C 3/20 244/123.3 |
| 5,476,704 | A * | 12/1995 | Kohler | B29C 66/114 428/119 |
| 5,484,221 | A * | 1/1996 | DeCoux | B62D 25/06 403/203 |
| 5,501,414 | A * | 3/1996 | Bauer | B64C 3/18 244/123.4 |
| 5,624,622 | A * | 4/1997 | Boyce | B29C 44/569 264/258 |
| 5,848,765 | A * | 12/1998 | Gillespie | B64C 9/18 244/124 |
| 6,050,523 | A * | 4/2000 | Kraenzien | B64C 21/06 244/123.1 |
| 6,116,539 | A * | 9/2000 | Williams | B64C 3/10 244/46 |
| 6,179,086 | B1 * | 1/2001 | Bansemir | G10K 11/172 181/198 |
| 6,237,873 | B1 * | 5/2001 | Amaoka | B64C 3/00 244/123.7 |
| 6,267,838 | B1 * | 7/2001 | Saugnac | G10K 11/172 156/320 |
| 6,616,101 | B2 * | 9/2003 | De Castro Nodal | B64C 3/20 244/123.3 |
| 6,740,381 | B2 * | 5/2004 | Day | B29C 70/086 428/56 |
| 6,851,515 | B2 * | 2/2005 | Dussac | B64C 1/40 181/284 |
| 6,935,472 | B2 * | 8/2005 | Dussac | F16F 7/01 188/380 |
| 7,419,031 | B2 * | 9/2008 | Liguore | B32B 3/12 181/210 |
| 7,731,128 | B2 * | 6/2010 | Overbergh | B64C 9/24 244/214 |
| 8,056,850 | B2 * | 11/2011 | Lin | B32B 3/12 244/1 N |
| 8,292,214 | B2 * | 10/2012 | Lin | B32B 5/12 244/1 N |
| 9,289,927 | B2 * | 3/2016 | Weber | B29C 70/24 |
| 9,381,992 | B2 * | 7/2016 | Pereira Mosqueira | B64C 3/185 |
| 9,611,030 | B2 * | 4/2017 | Petiot | B64C 11/205 |
| 9,637,212 | B2 * | 5/2017 | Cottet | F16F 7/12 |
| 9,878,770 | B2 * | 1/2018 | Mueller | B64C 1/066 |
| 10,086,921 | B2 * | 10/2018 | Kismarton | B64C 1/12 |
| 10,131,415 | B2 * | 11/2018 | Nordin | B64C 3/28 |
| 10,647,418 | B2 * | 5/2020 | Seifert | B64C 27/04 |
| 2002/0166721 | A1 * | 11/2002 | Monson | G10K 11/16 181/292 |
| 2005/0194210 | A1 * | 9/2005 | Panossian | B32B 3/266 181/293 |
| 2006/0065784 | A1 * | 3/2006 | Rouyre | B64D 29/06 244/119 |
| 2006/0243854 | A1 * | 11/2006 | Townsend | B64C 1/062 244/17.11 |
| 2008/0277057 | A1 * | 11/2008 | Montgomery | B29C 70/34 156/307.1 |
| 2009/0184206 | A1 * | 7/2009 | Lin | F16F 7/01 244/158.1 |
| 2012/0024646 | A1 * | 2/2012 | Tsugihashi | F16F 7/015 188/268 |
| 2015/0298787 | A1 * | 10/2015 | Nordin | B64C 1/12 244/45 R |
| 2015/0344119 | A1 * | 12/2015 | Dazet | B64C 1/18 244/119 |
| 2016/0076699 | A1 * | 3/2016 | Ramaska | B62D 21/183 52/653.1 |
| 2016/0215646 | A1 * | 7/2016 | Gonyou | F01D 11/12 |
| 2017/0334552 | A1 * | 11/2017 | Seifert | B64C 27/04 |
| 2019/0071163 | A1 * | 3/2019 | Ludin | B64C 1/062 |
| 2019/0077093 | A1 * | 3/2019 | Tsotsis | B32B 3/30 |

* cited by examiner

ENERGY ATTENUATION STABILIZERS AND METHODS

STATEMENT REGARDING FEDERALLY SPONSORED RESEARCH OR DEVELOPMENT

Not applicable.

BACKGROUND

Traditional tail skids are attached to the tip of a stabilizer (e.g., a vertical tail fin) to act as an absorber to minimize an impact load induced by a tail landing (i.e., an impact event). While tail skids have energy absorption capabilities, tail skids are drag inducers, require an additional support structure, and contribute to limitations to the maximum dimensions of the stabilizer and/or ground clearance.

SUMMARY

According to one implementation of the present disclosure, a stabilizer of an aircraft includes an energy attenuating portion. The energy attenuating portion includes first and second edge sections separated by an adaptable section. The adaptable section may be rigid in a first range of directions and compressible in a second range of directions.

According to another implementation of the present disclosure, a stabilizer of an aircraft includes an energy attenuating portion. The energy attenuating portion includes a fiber-laid skin and an adaptable section enclosed within the fiber-laid skin. The adaptable section may be rigid in a first range of directions and compressible in a second range of directions.

According to another implementation of the present disclosure, a method of energy attenuation of a stabilizer includes forming an energy attenuating portion of the stabilizer. In certain implementations, forming the energy attenuating portion includes: laying up, in a distal region of the stabilizer, an adaptable section having a plurality of cells; determining a first stiffness component of the adaptable section corresponding to one of a plurality of directions in a first range of directions; determining a second stiffness component of the adaptable section corresponding to one of a plurality of second directions in a second range of directions; computing a stiffness metric based on the first stiffness component and a second stiffness component; and positioning, in the distal region, the adaptable section based on the stiffness metric.

The above-referenced summary section is provided to introduce a selection of concepts in a simplified form that are further described below in the detailed description section. Additional concepts and various other implementations are also described in the detailed description. The summary is not intended to identify key features or essential features of the claimed subject matter, nor is it intended to be used to limit the scope of the claimed subject matter, nor is it intended to limit the number of inventions described herein. Furthermore, the claimed subject matter is not limited to implementations that solve any or all disadvantages noted in any part of this disclosure.

BRIEF DESCRIPTION OF THE DRAWINGS

The present technique(s) will be described further, by way of example, with reference to embodiments thereof as illustrated in the accompanying drawings. It should be understood, however, that the accompanying drawings illustrate only the various implementations described herein and are not meant to limit the scope of various techniques, methods, systems, or apparatuses described herein.

Reference is made in the following detailed description to accompanying drawings, which form a part hereof, wherein like numerals may designate like parts throughout that are corresponding and/or analogous. It will be appreciated that the figures have not necessarily been drawn to scale, such as for simplicity and/or clarity of illustration. For example, dimensions of some aspects may be exaggerated relative to others. Further, it is to be understood that other embodiments may be utilized. Furthermore, structural and/or other changes may be made without departing from claimed subject matter. References throughout this specification to "claimed subject matter" refer to subject matter intended to be covered by one or more claims, or any portion thereof, and are not necessarily intended to refer to a complete claim set, to a particular combination of claim sets (e.g., method claims, apparatus claims, etc.), or to a particular claim. It should also be noted that directions and/or references, for example, such as up, down, top, bottom, and so on, may be used to facilitate discussion of drawings and are not intended to restrict application of claimed subject matter. Therefore, the following detailed description is not to be taken to limit claimed subject matter and/or equivalents.

DETAILED DESCRIPTION

Example embodiments of the present disclosure allow for energy from an impact to be attenuated by the stabilizer itself through plastic deformation, such that either minimal or no damage may be transferred to the tail boom/air frame structure of the aircraft. In doing so, energy attenuation capabilities can be provided within the sleek airfoil design (i.e., aerodynamic shape) of the stabilizer itself that is optimized for peak aerodynamic performance (e.g., to minimize drag and provide desired aerodynamic force).

The inventive aspects of the present disclosure further allow for the capacity to provide for a spectrum of stiffness metrics between rigidity and flexibility according to a particular energy attenuation profile. Correspondingly, in anticipation of an impact event, stabilizers may be constructed to have a certain rigidity (i.e., a first stiffness component) in a first range of directions and certain compressibility (i.e., a second stiffness component) in the second range of directions. In addition, the stabilizers and methods described herein reduce part counts (by eliminating the need for tail skids, hence promoting lower cost and less weight) and allow for increases in stabilizer aerodynamic surface.

Figure 1:
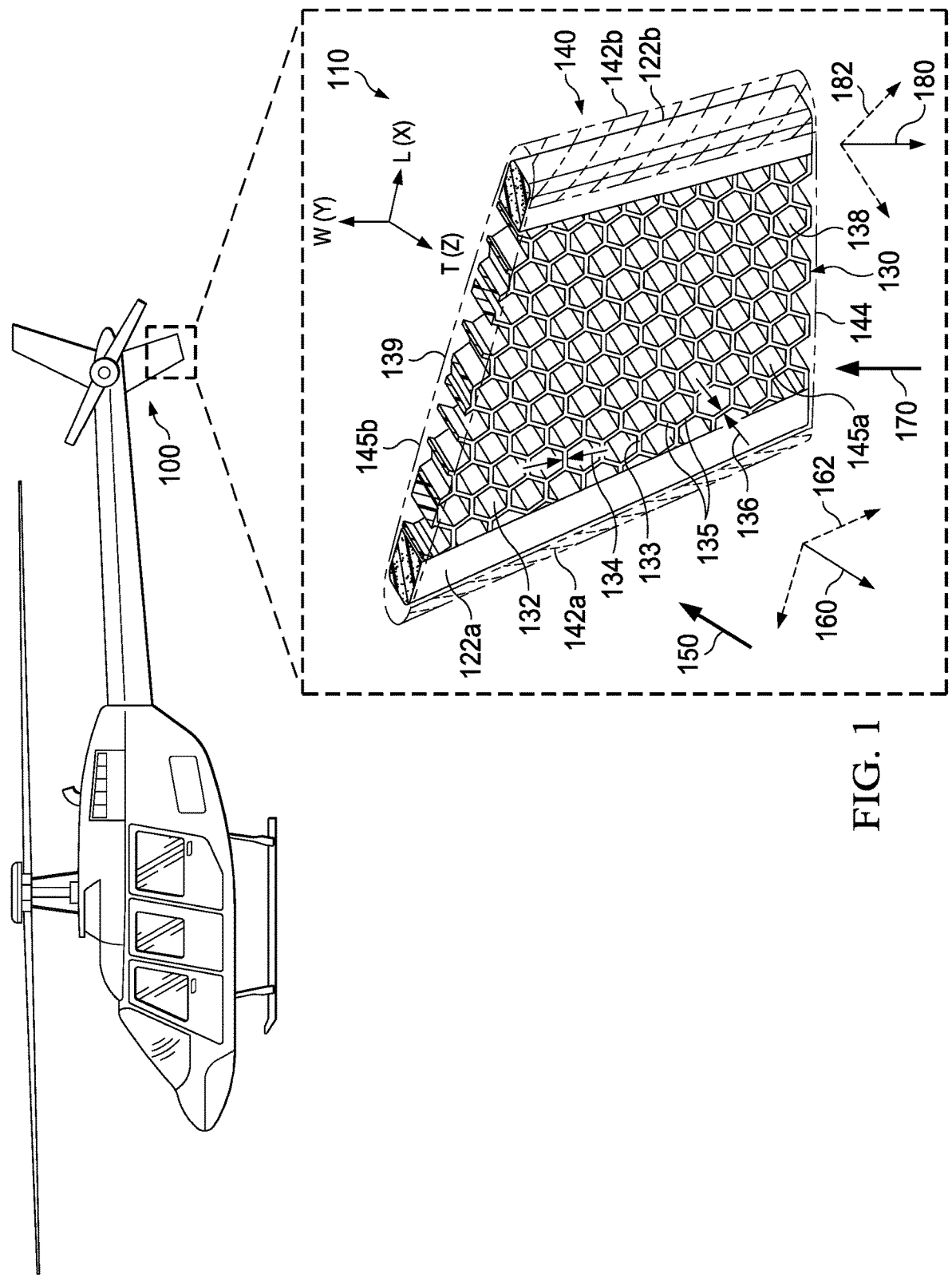
FIG. 1 illustrates a perspective view of an energy attenuating portion in accordance with implementations of various techniques described herein.
Figure 2:
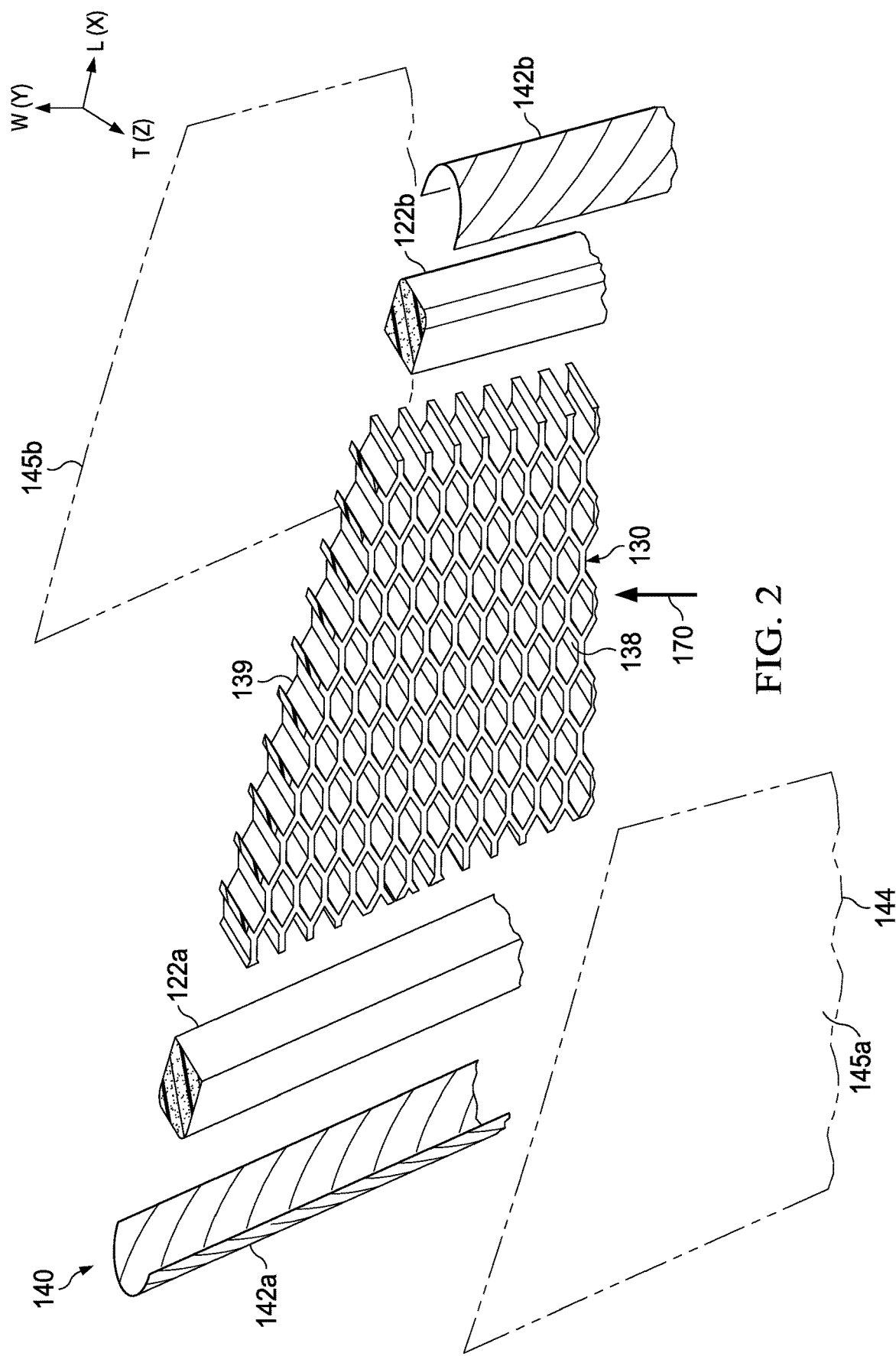
FIG. 2 illustrates an exploded view of an energy attenuating portion in accordance with implementations of various techniques described herein.

Referring to FIGS. 1 and 2, perspective transparent views of an energy attenuating portion (i.e., an energy offsetting portion, an energy attenuating section) 110 of a stabilizer 100 for an aircraft is shown prior to an impact event (FIG. 1) and after an impact event (i.e., after plastic deformation) (FIG. 2). The stabilizer 100 may be a vertical stabilizer (i.e., a vertical fin, a tail fin, a vertical plank) or a horizontal stabilizer (i.e., a horizontal fin, a horizontal plank) of the aircraft. As shown in FIGS. 1 and 2, the energy attenuating portion 110 may include a first edge section 122a (i.e., a leading edge), a second edge section (i.e., a trailing edge) 122b, and an adaptable section 130 (i.e., an adaptable inner section). The adaptable section 130 may be a lattice-type, porous, structural core and/or orienting core. Moreover, the adaptable section 130 may be rigid (i.e., inflexible, stiff) in a first range of directions 162 and may be compressible (i.e., frangible, condensable, collapsible, flexible) in a second range of directions 182. In some implementations, the first range of directions 162 may be directions in three-dimensional space (i.e., XYZ-axes) to counter aerodynamic loads (including aerodynamic load 150 (i.e., aerodynamic load vector, drag force vector) that can be countered on X and Z-axes). Moreover, in certain implementations, the second range of directions 182 may be directions on one or more X-Y planes to counter an impact load (i.e., a vertical impact load, impact load vector) such as impact load 170. In example embodiments, the first and second edge sections 122a, 122b may be made of the same rigid material(s) as that of the rest of the stabilizer 100 itself that is optimized for a predefined aerodynamic shape. As illustrated, the perspective transparent views in FIGS. 1A-1B depict the W-direction (transverse to a ribbon direction), L-direction (corresponding to the ribbon direction), and T-direction that is shown with as an example orientation (i.e., positioning, rotation) that is matched to the X-axis, Y-axis, and Z-axis, respectively. Such an orientation may be predetermined during construction of the energy attenuating section 110.

As shown in FIG. 1, in certain implementations, the adaptable section 130 may be adjoined (e.g., bonded via adhesives) or, alternatively, coupled to the first and second edge sections 122a, 122b. As illustrated, before an impact event, the adaptable section 130 is positioned proximate to, and in between, the first and second edge sections 122a, 122b where the first and second edge sections 122a, 122b are situated on opposing sides of the adaptable section 130.

In certain aspects, as shown in FIG. 1, the first and edge sections 122a, 122b and the adaptable section 130 may be distinct regions of the stabilizer 100 that may be either contiguous to or, alternatively, coupled to the stabilizer 100. The first and second edge sections 122a, 122b may be structural and part of the airfoil itself and carry aerodynamic loading such that the first and second edge sections 122a, 122b are able to provide aerodynamic lift (i.e., the force that is perpendicular to the oncoming air-flow). Also, whereas FIG. 1 illustrates the first and second edge sections 122a, 122b as a significantly narrower rectangular tube design shape in comparison to the adaptable section 130, in certain alternative implementations, the design can be formed in other shapes and include wider dimensions (with greater surface area). Conversely, although the adaptable section 130 is shown to have a significantly wider shape than the first and second edge sections 122a, 122b, in alternative implementations, the adaptable section 130 can be formed in other shapes and having narrower dimensions (with lesser surface area). The shape and size dimensions of the energy attenuating section 110 may be designed according to a precise aerodynamic shape and attenuation profile as per build requirements. Such aerodynamic shape and attenuation profiles correspond to certain stiffness metrics (i.e., corresponding to the extent that the energy attenuating portion 110 may resist deformation in response to aerodynamic and impact forces (i.e. load vectors)).

The first and second edge sections 122a, 122b may be made of any light-weight but rigid composite core material (e.g., a composite carbon fiber reinforced polyurethane foam) and/or a thin metal (e.g., a metal alloy such as an aluminum or titanium alloy) etc. that can be the same as the other regions of the stabilizer.

The adaptable section 130 may be a lattice-type, porous, structural core and/or an orienting core. Suitably, the adaptable section 130 may be made of any light-weight and flexible (i.e., collapsible) core made up of one or more core materials (including reinforced materials) (e.g., thermoplastics (e.g., polyethylene), nomex paper, fabrics, carbon fiber etc.) in a variety of different shapes, layers, and sizes (e.g., as described with reference to FIG. 4 below). In certain aspects, the adaptable section 130 may comprise a plurality of cells 132 (e.g., composite layup of fabric layers (prepreg plies) during construction/orientation). The plurality of cells 132 may include one or more cell sizes, layers, shapes, and cell densities. Advantageously, by varying cell sizes, layers, and densities, the inventive aspects include the capacity to vary the attenuating rate (i.e., sink rate, the rate at which the plurality of cells 132 may be configured to receive different magnitudes of energy attenuation from the impact load 170). In some cases, each of the plurality of cells 132 may include nodes 133 (i.e., the walls of each cell that are parallel to the ribbon direction) and free walls 135 (i.e., the angled walls adjacent to the nodes). The nodes 133 of the plurality of cells 132 may have a first thickness 134 to transfer aerodynamic loads (such as the aerodynamic load vector 150 on the X and Z-axes) in the first range of directions 162, while the free walls 135 may have a second thickness 136 to attenuate the impact load (e.g., the impact load 170) in a second range of directions 182. Accordingly, as the adaptable section 130 is constructed to be rigid in the first range of directions 162 and frangible in the second range of directions 182, the first thickness 134 may be greater than the second thickness 136. Advantageously, the varying differences in the first and second thicknesses 134, 136 allow for greater customization of the adaptable section 130. Moreover, during construction, by positioning (i.e., orienting, rotating) the plurality of cells 130, the L-direction (i.e., the ribbon direction) of the plurality of cells 134 may be rotated, and as a result, a designer has the capacity to increase or decrease the cumulative thickness for the X and Z-axes (for appropriate reaction to aerodynamic loads such as the aerodynamic load vector 150) and the Y-axis (for appropriate reaction to impact loads such as the impact load vector 170). Accordingly, the fiber orientation of the plurality of cells 130 may be tailored for both energy attenuation and aerodynamic profiles.

The stabilizer 100 may further include a fiber-laid skin 140 (i.e., an outer skin, an outer encasing) that may fully surround and bond (via an adhesive film) to at least the energy attenuation portion 110 of the stabilizer 100. More specifically, the fiber-laid skin 140 may enclose at least the first and second edge sections 122a, 122b and the adaptable section 130, and provide one or more aerodynamic surfaces for the aerodynamics shape of the airfoil. Accordingly, the fiber-laid skin 140 facilitates the requisite aerodynamic performance (such as to minimize drag and increase lift). In certain instances, the outer skin 140 may be made from any light-weight material including a fabric (e.g., fabric layers, composite fibers) or a thin metal (e.g., a metal alloy such as an aluminum alloy) etc.

In some implementations, the fiber-laid skin 140 may include at least a first skin portion (142($a,b$), 145($a,b$)) (i.e., a first fiber-laid skin portion) and a second skin portion 144 (i.e., a second fiber-laid skin portion). The first skin portion 142$a$ may enclose and bond (via an adhesive film) the first edge section 122$a$, while the first skin portion 142$b$ may enclose and bond (via an adhesive film) the second edge section 122$b$. Also, the second skin portion 144 may enclose and bond (via an adhesive film) lower and/or bottom portions of the adaptable section 130. In such implementations, for example, the at least first and second skin portions 142($a,b$), 144 may include different tailored composite materials (i.e., fiber-reinforced material) but are made to be contiguous with one another such that the stabilizer 100 can maintain an optimally sleek and precise aerodynamic shape as per build requirements. In certain examples, the first skin portion 142($a,b$) may include one or more first materials (e.g., fiber-reinforced rigid composite material such as tailored glass fiber, fiber glass, and thin-metals (e.g., metal alloys)) and the second skin portion 144 may include one or more second materials (i.e., "frangible", "flimsy", soft composite material, fabrics (e.g., fabric layers, composite fibers). Suitably, in such examples, the first materials may be stiffer than the second materials 145. Advantageously, in one implementation, the first skin portion 145($a,b$) may also be included on a front side 138 and a back side 139 of the adaptable section 130. Also, in such an implementation, the second skin portion 144 would be included on bottom portions of the stabilizer 100. Thus, the first skin portion 145($a,b$) may be designed to have sufficient stiffness to optimally react to the aerodynamic load vector 150 in the first range of directions 162, while the second skin portion 144 may be designed to have sufficient frangibleness (so as to be "crushed" and attenuate energy) to optimally react to the vertical load vector 170 from impact in the second range of directions 182.

FIG. 2 illustrates the energy attenuating portion 110 after an impact event, such as when an aircraft contacts the ground during a tail-landing such that the aircraft's stabilizer 100 tilts backward and makes contact with the ground. As shown in FIG. 2, in certain cases, upon the impact event, the adaptable section 130 would at least partially plastically deform (e.g., be compressed), and in other cases, the adaptable section 130 would entirely plastically deform (e.g., be "crushed" or "destroyed"). Also, as shown in FIG. 2, as a result of the impact, in one example, the first and second edge sections 122$a$, 122$b$ and the outer skin 140 (including first and second skin portions 142($a,b$), 144) would also detach (e.g., break-off, break apart) from the energy attenuating portion 110. In another example, the first edge section 122$a$ and the first skin portion 142$a$ would detach together as would the second edge section 122$b$ and the first skin portion 142$b$. Moreover, in certain cases, upon an impact, depending upon the extent of the deformation of the adaptable section 130, the second skin portion 144 may remain attached to the unaffected (i.e., non-impacted) portion of the adaptable section 130. Accordingly, in such cases, the section skin portion 144 may break but not completely detach.

In an example operation, when contact with the ground occurs at a particular angle of impact 180 (i.e., the impact angle as formed in relation to the bottom edge of the stabilizer 100), an impact load 170 is induced such that normal force is translated in the vertical load vector 170 (having a direction opposite the impact angle 180). Upon receiving the vertical load vector 170, the adaptable section 130 may collapse (while the rest of the energy attenuating portion 110 "breaks apart") and attenuate the magnitude of the normal force. Thus, stress damage to the tail boom of the aircraft may be minimized or prevented.

Advantageously, inventive aspects of the present invention allow for the capacity to provide for a spectrum of stiffness between rigidity and flexibility in the energy attenuating portion 110. Correspondingly, in response to an impact event, the energy attenuating portion 110 may be constructed to have a certain rigidity (i.e., a first stiffness component) in the first range of directions 162 and certain compressibility (i.e., a second stiffness component) in the second range of directions 182.

In certain implementations, the first range of directions 162 relate to the range of directions whereupon the plurality of cells 132 have the capacity to counteract the aerodynamic loads (e.g., the aerodynamic load vector 150 on the Z-directional axis and normal to the stabilizer 100). Each individual direction in the first range of directions 162 corresponds to a different first stiffness component having a different stiffness magnitude (e.g., low to high) based on the first thickness 134 in the plurality of cells 132. Similarly, the second range of directions 182 relate to the range of directions whereupon the plurality of cells 132 have the capacity to counteract the impact load (e.g., the vertical load vector 170 on one or more X-Y planes). Each individual direction in the second range of directions 182 corresponds to a different second stiffness component having a different stiffness magnitude (low to high) based on the second thickness 136 in the plurality of cells 132.

For a desired attenuation profile, a designer may predetermine the first and second stiffness components based on various factors including: the bending stiffness, shear stiffness, bending moment at the energy attenuating portion 110, and the allowable shear stress of the energy attenuation portion 110. The first and second stiffness components may also account for the variability in the specific cell shapes, layers, sizes, and wall thicknesses that make up the plurality of cells 132. Further consideration may also be given to, inter alia, the gross weight of the aircraft, landing gear geometry, and whether the aircraft may be intended for vertical landing.

Furthermore, a stiffness metric may be computed based on a combination of the first and second stiffness components considering the specific build requirements. The stiffness metric may define and correspond to a specific orientation angle of the adaptable section 130 for an optimal attenuation and aerodynamic profile of the stabilizer 100. To do so, during construction, the designer may rotate (i.e., position, angle) (one or more composite layups/carbon fibers of) the plurality of cells 132 that make up the adaptable section 130 in the L-direction (i.e., the ribbon direction) and W-direction (i.e., the direction transverse to the ribbon direction) (i.e., on the X-Y plane). In doing so, the cumulative thicknesses/stiffness components for each individual cell may differ in different directions, and a predetermined energy attenuation and aerodynamic profile may be obtained. Accordingly, the adaptable section 130 can vary the attenuating rate (i.e., sink rate), the rate at which the plurality of cells 132 may be configured to receive different magnitudes of energy from impact loads.

In one example, for maximum compressibility, during construction, the plurality of cells 132 may be rotated "clockwise" in the L and W-directions until that the L-direction is transverse to an angled impact load (e.g., that impacts the stabilizer 100 at approximately 45°). Accordingly, upon an impact event, the angled impact load may fully attenuate the adaptable section 130. In a second example, the plurality of cells 132 that make up the adaptable section 130 may be rotated clockwise 45° (from what is shown in FIG. 1) in the L-direction and W-direction to counter the impact load 170 (that would make contact with the stabilizer 100 at approximately 90° (i.e., on the Y-axis)). In doing so, the energy attenuating portion 130 may now have medium compressibility. In a third example, for optimal vertical landing (similar to as shown for example in FIG. 1), the L-direction W-direction, and T-direction may be approximately identical to the X-axis, Y-axis, and Z-axis, respectively, of the stabilizer 100. In such an example, there would be maximum stiffness for aerodynamic loads (as the ribbon direction is approximately the same as, for example, the aerodynamic load vector 150), and maximum compressibility for the impact load vector 170 that is substantially transverse to the ribbon direction upon stabilizer impact with the ground.

Advantageously, in implementations, the energy attenuating portion 110 allows for the energy to be attenuated during an impact event such that either minimal or no damage may be translated from the stabilizer 100 to the airframe structure of the aircraft. Specifically, the energy attenuation capacity is integral within the aerodynamic shape of the stabilizer 100 necessary for optimal aircraft performance. For instance, the stabilizer 100 includes a precise size and shape, and exact dimension angles that are based on computational fluid dynamics and flight tests.

One further advantage resulting from the elimination of the tail skid in the inventive aspects is the capacity to design the stabilizer with greater surface area. For example, to reduce torsional load in the tail-boom, aircraft designers ideally prefer having to the extent possible equivalent surface area on both top and bottom sides of a tail boom centerline axis. Hence, when aerodynamic loads are introduced during flight, the torsional load and stresses on the tail boom may be substantially neutralized. In addition, by removing the tail skids a greater flare angle for landing as well as a greater ground clearance when landing on uneven soil may also be realized.

Figure 3:
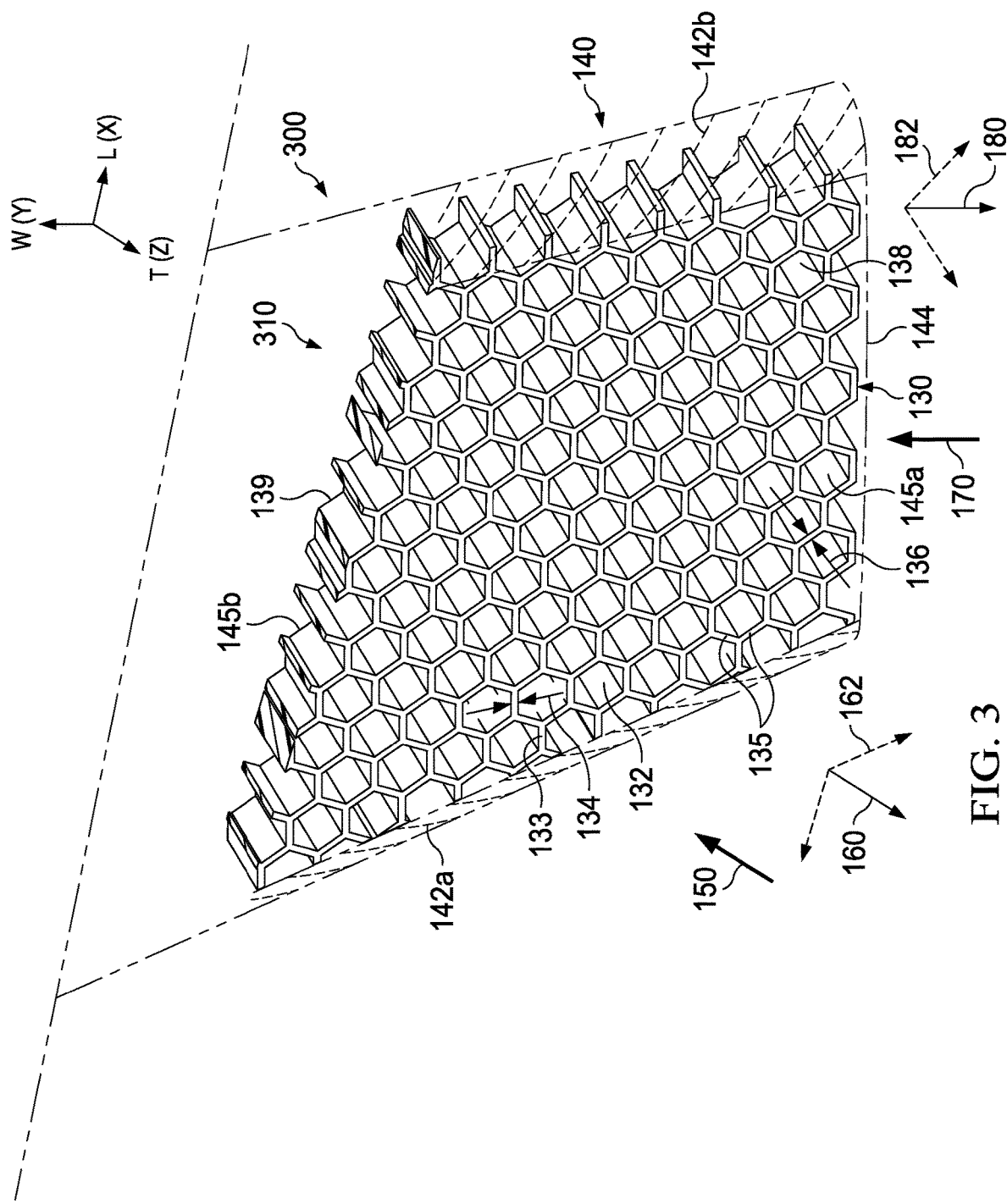
FIG. 3 illustrates a perspective view of an energy attenuating portion in accordance with implementations of various techniques described herein.

Referring to FIG. 3, a perspective transparent view of an energy attenuating portion (i.e., an energy offsetting portion, an energy attenuating section) 110 of a stabilizer 300 for an aircraft is shown prior to an impact event. The stabilizer 300 may be a vertical stabilizer (i.e., a vertical fin, a tail fin, a vertical plank) or a horizontal stabilizer (i.e., a horizontal fin, a horizontal plank) of the aircraft. As shown in FIG. 3, the energy attenuating portion 310 is substantially similar in construction, materials, and operation to the energy attenuating portion 110 in FIG. 1, with one notable distinction that the energy attenuating portion 310 does not include the first and second edge sections 122a, 122b Accordingly, in FIG. 3, the energy attenuating portion 110 may include a fiber-laid skin 140 (i.e., an outer skin, an outer encasing) and an adaptable section 130 (i.e., an adaptable inner section) enclosed within the fiber-laid skin 140. In certain implementations, the fiber-laid skin 140 may fully surround at least the energy attenuation portion 310 of the stabilizer 100. As such, the fiber-laid skin 140 provide one or more aerodynamic surfaces for the aerodynamics shape of the airfoil. Accordingly, the fiber-laid skin 140 facilitates the requisite aerodynamic performance (such as to minimize drag and increase lift).

In some implementations, the fiber-laid skin 140 may include at least a first skin portion (142(a,b), 145(a,b)) (i.e., a first fiber-laid skin portion) and a second skin portion 144 (i.e., a second fiber-laid skin portion). Suitably, the first skin portion 142(a,b) may enclose and bond (via an adhesive film) to side edges of the adaptable portion 130, while the second skin portion 144 may enclose and bond (via an adhesive film) to the lower and/or bottom portions of the adaptable section 130. Similar to FIG. 1, in such implementations, the at least first and second skin portions 142(a,b), 144 may include different tailored composite materials (i.e., fiber-reinforced material) but are made to be contiguous with one another such that the stabilizer 100 can maintain an optimally sleek and precise aerodynamic shape as per build requirements. Advantageously, in one implementation, the first skin portion 145(a,b) may also be included on a front side 138 and a back side 139 of the adaptable section 130. Also, in such an implementation, the second skin portion 144 would be included on bottom portions of the stabilizer 100. Thus, the first skin portion 145(a,b) may be designed to have sufficient stiffness to optimally react to the aerodynamic load vector 150 in the first range of directions 162, while the second skin portion 144 may be designed to have sufficient frangibleness (so as to be "crushed" and attenuate energy) to optimally react to the vertical load vector 170 from impact in the second range of directions 182.

In addition, while not shown, similar to as described with respect to FIG. 2, after an impact event, in certain cases, the energy attenuating portion 310 may at least partially plastically deform (e.g., be compressed). In other cases, the adaptable section 130 may entirely plastically deform (e.g., be "crushed" or "destroyed"). Also, as a result of the impact, the outer skin 140 (including first and second skin portions 142(a,b), 144) would detach (e.g., break-off, break apart) from the energy attenuating portion 310.

Figure 4A:
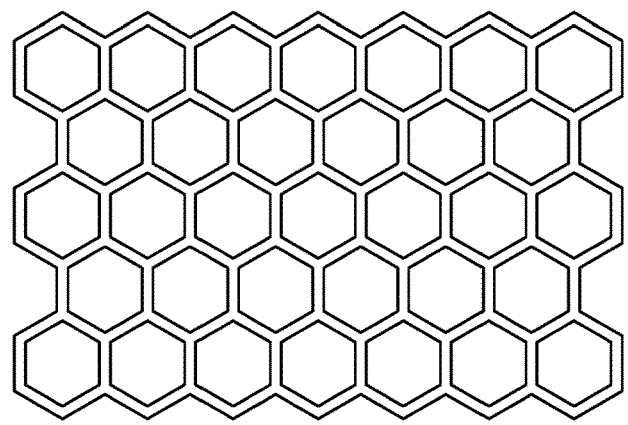
FIGS. 4A to 4N illustrate top views of cell shapes in accordance with implementations of various techniques described herein.
Figure 4B:
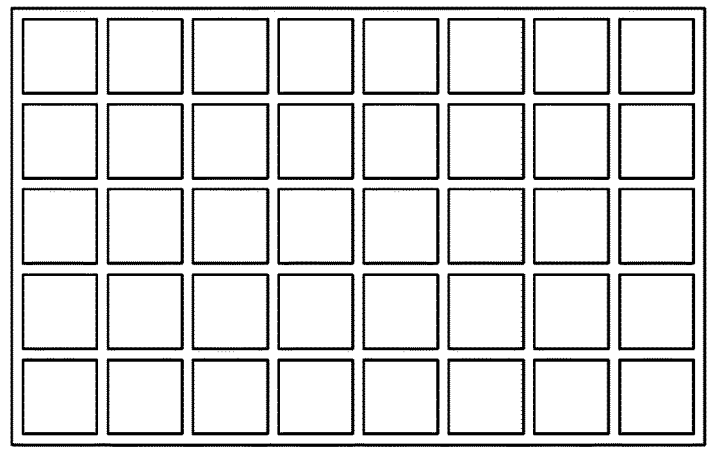
FIGS. 4O to 4U illustrate cut-away perspective views of cell shapes in accordance with implementations of various techniques described herein.
Figure 4C:
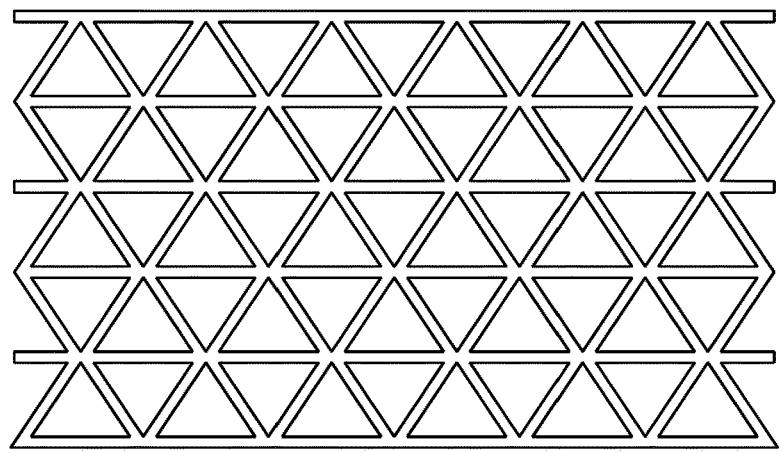
Figure 4D:
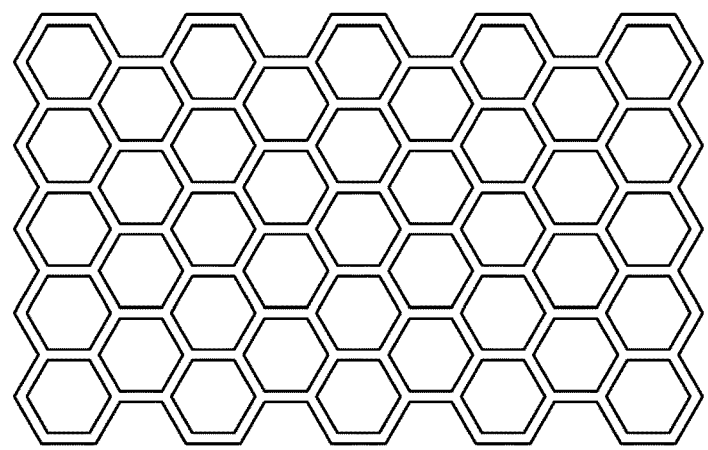
Figure 4E:
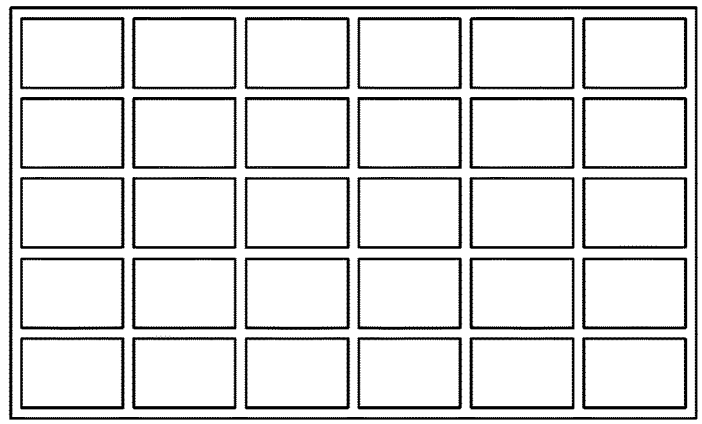
Figure 4F:
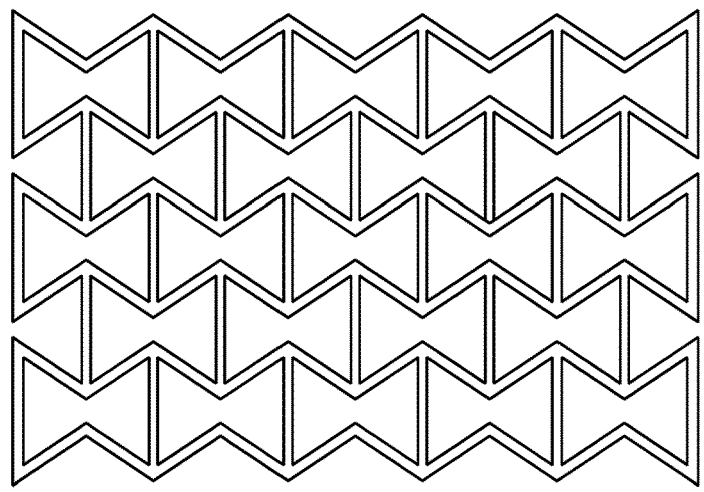
Figure 4G:
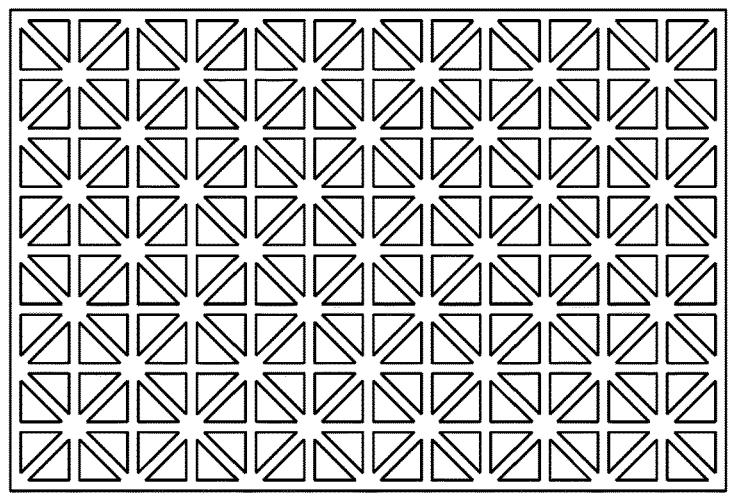
Figure 4H:
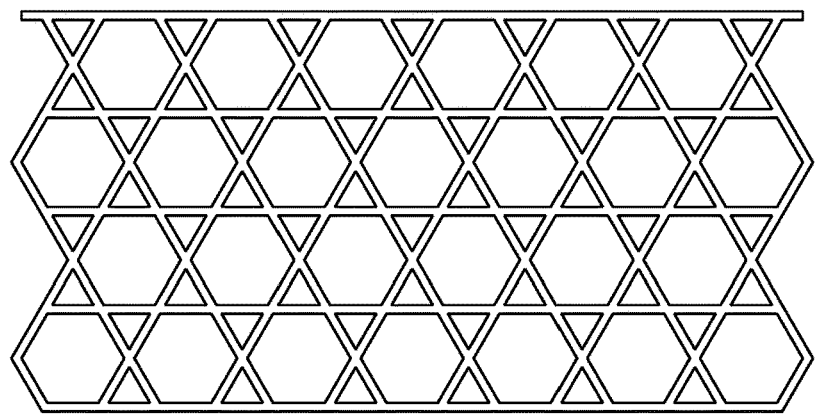
Figure 4I:
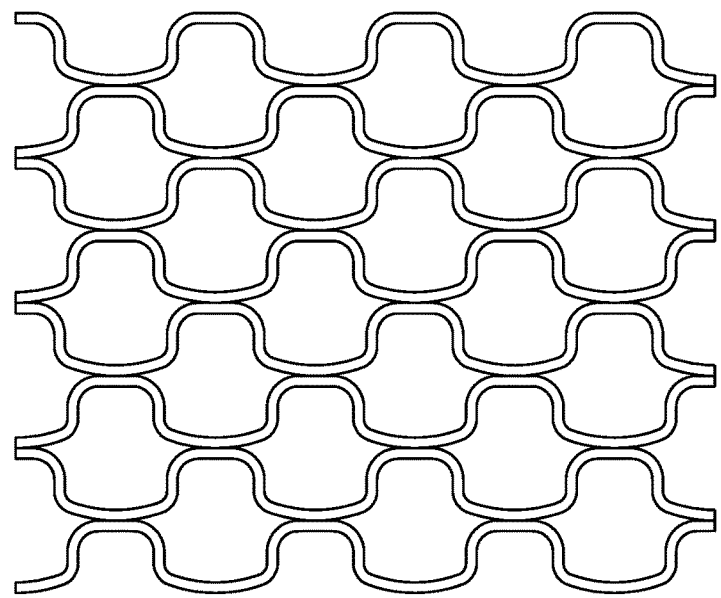
Figure 4J:
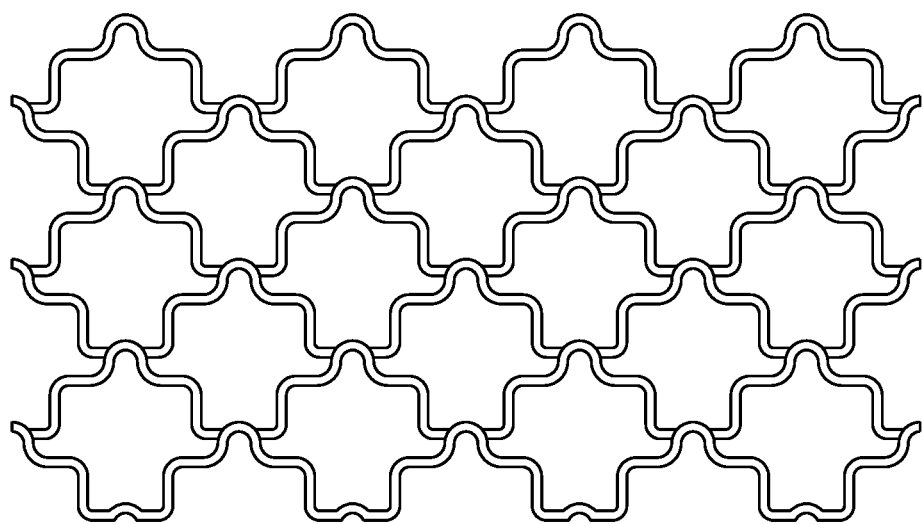
Figure 4K:
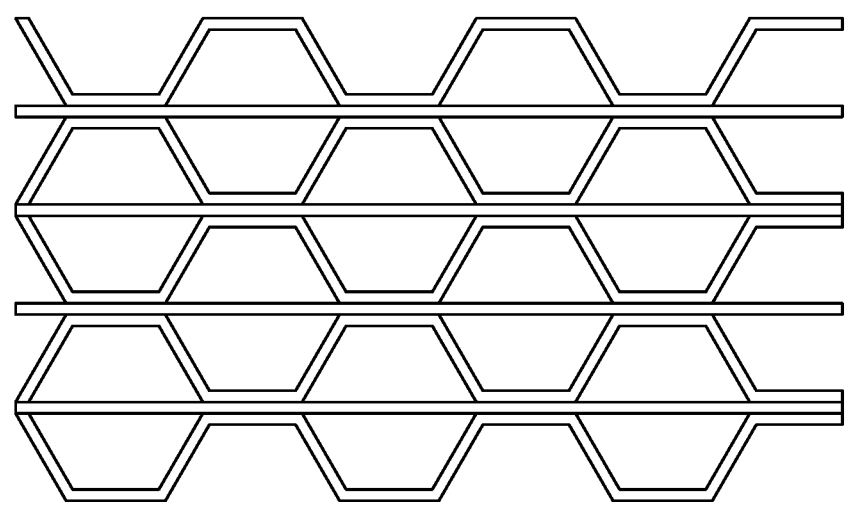
Figure 4L:
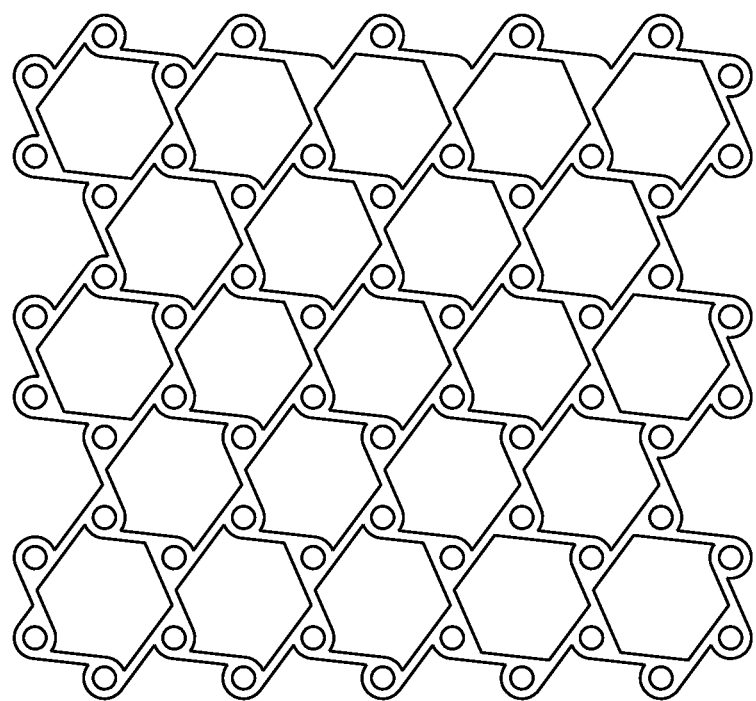
Figure 4M:
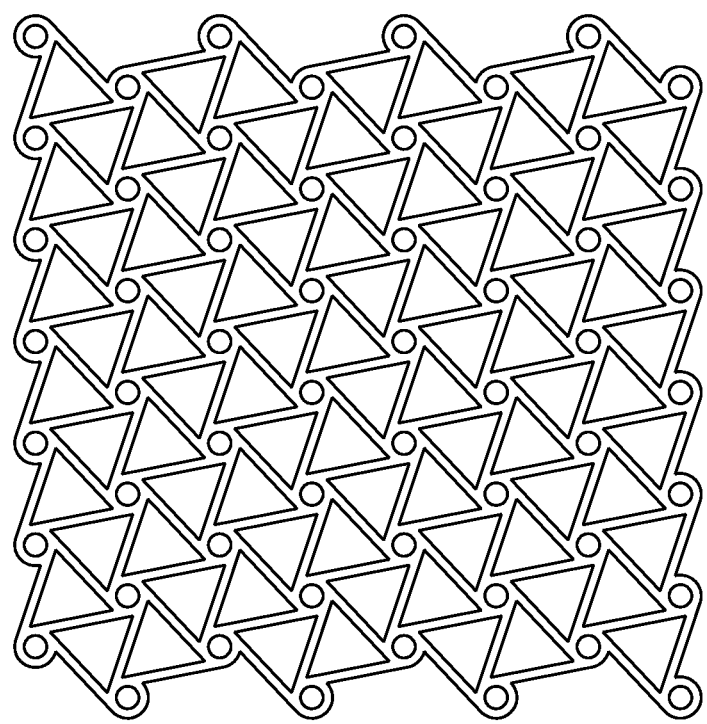
Figure 4N:
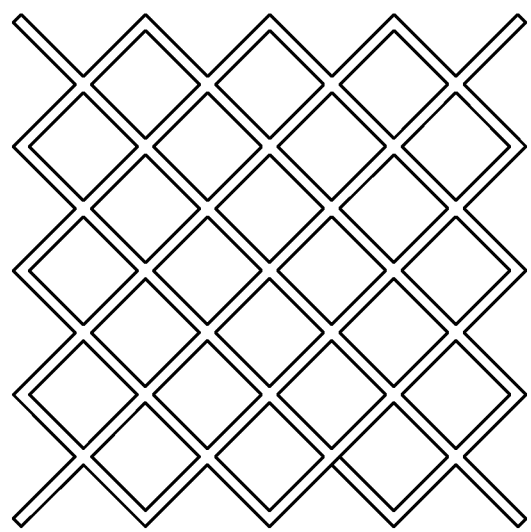
Figure 4O:
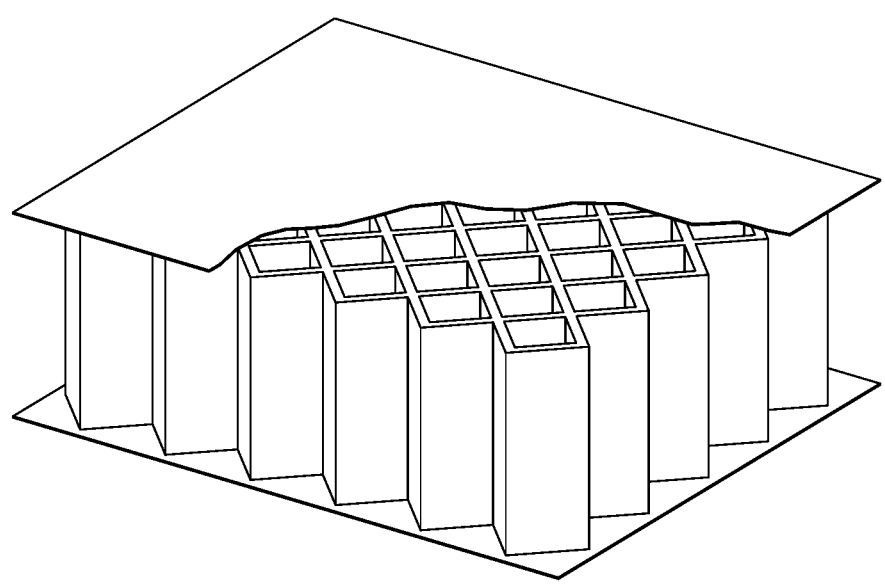
Figure 4P:
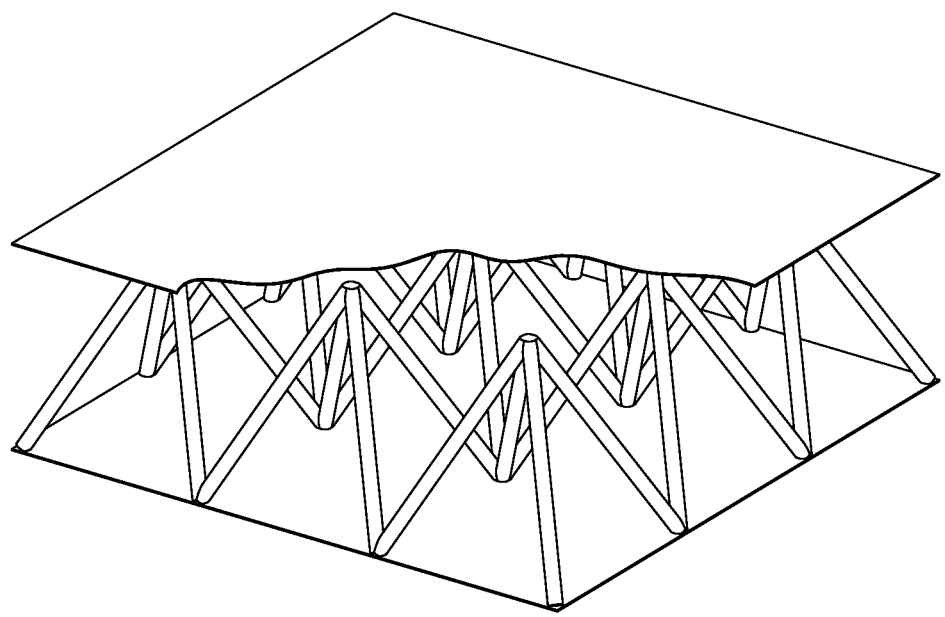
Figure 4Q:
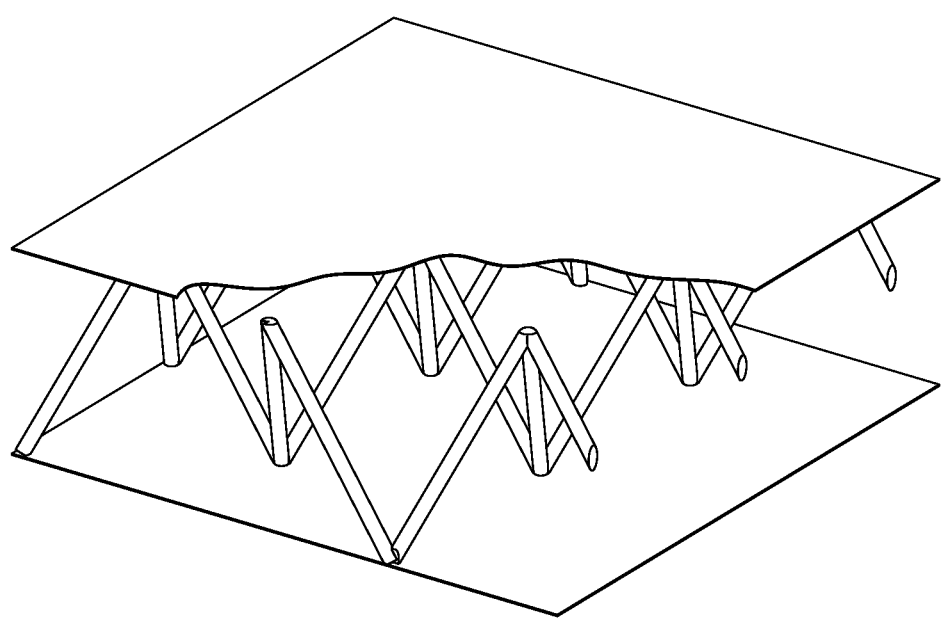
Figure 4R:
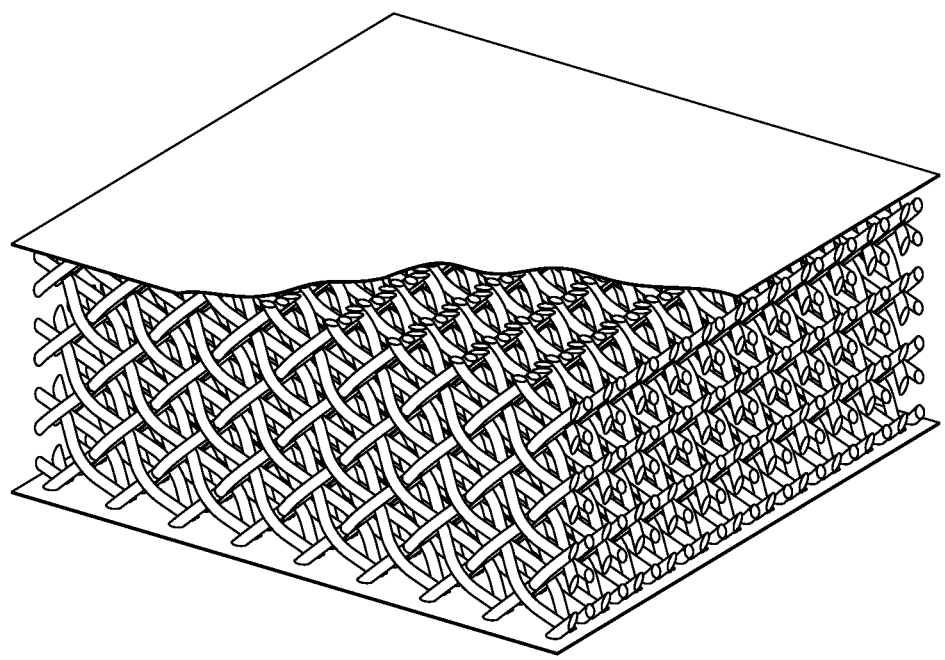
Figure 4S:
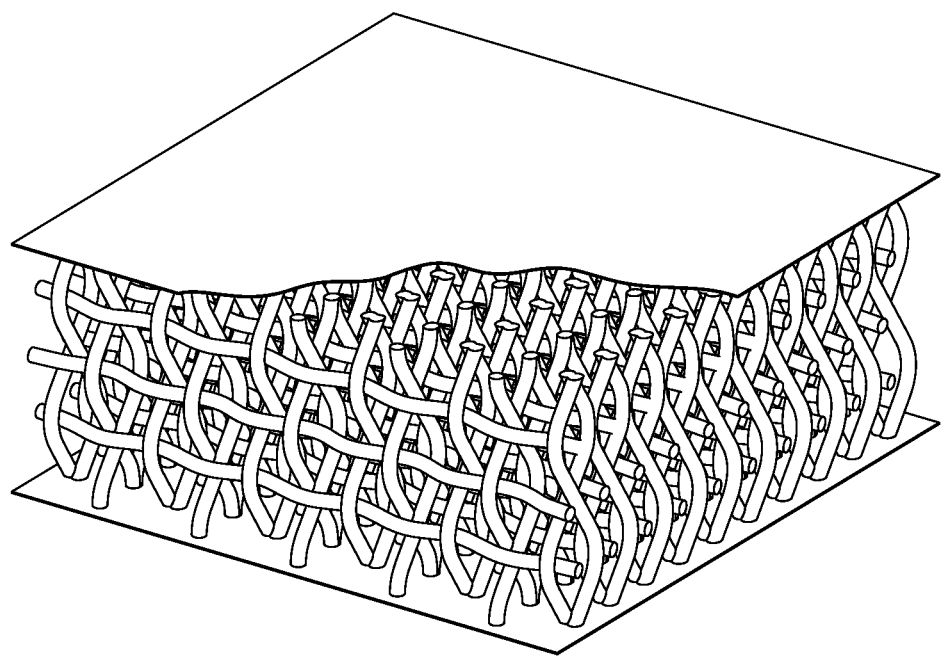
Figure 4T:
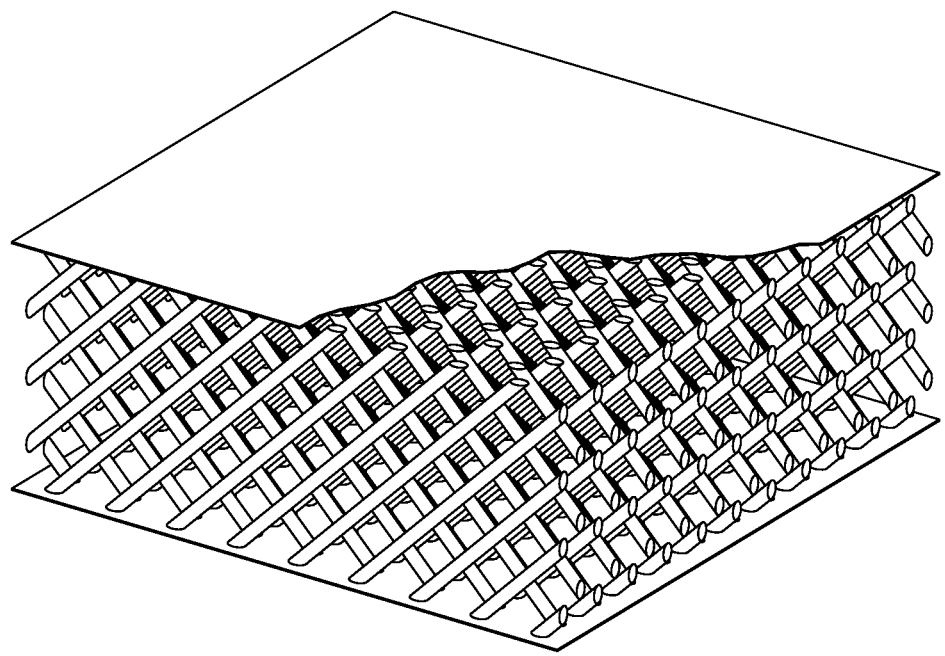
Figure 4U:
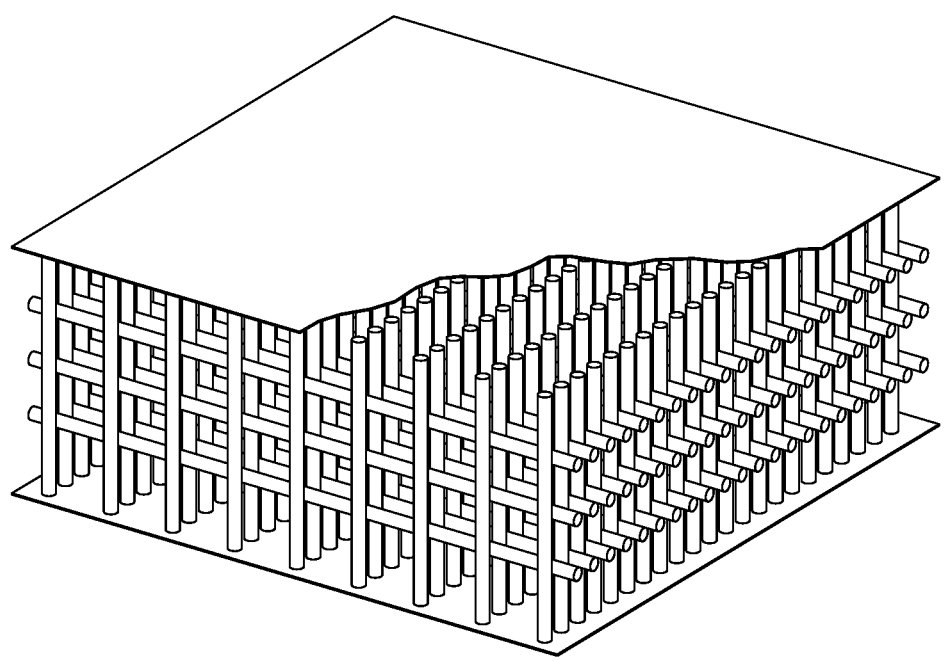

FIG. 4A to FIG. 4V illustrate various lattice structures having various cell shapes that may be implemented in the adaptable section 130 (as shown in FIGS. 1-3) including, for example, but not limited to, (a) Honeycomb with hexagonal cells, (b) Honeycomb with square cells, (c) Honeycomb with triangular cells, (d) Honeycomb with columnar cells, (e) Honeycomb with rectangular cells, (f) Honeycomb with reentrant hexangular cells, (g) Honeycomb with square super cells constructed from mix of square and triangle shapes, (h) Honeycomb with 3D-kagomë, (i) Honeycomb with flex-core cells, (j) Honeycomb with double-flex cells, (k) Honeycomb with reinforced hexagonal cells, (l) Honeycomb with tri-chiral cells, (m) Honeycomb with hexachiral cells, (n) Truss, (o) Corrugation, (p) Pyramidal, (q) Tetrahedral, (r) Diamond Textile, (s) Square Textile, (t) Diamond Collinear, and (u) Square Collinear. In various implementations, different combinations of the above-mentioned lattice structure types and cellular shapes may be used in lay-up construction of the adaptable section 130. Advantageously, in certain implementations, such lattice structure types and cellular shapes provide stiffness "out-of-plane", while providing "softness" (i.e., flexibility) "in-plane" (i.e., where the ground makes contact upon an impact event).

Figure 5:
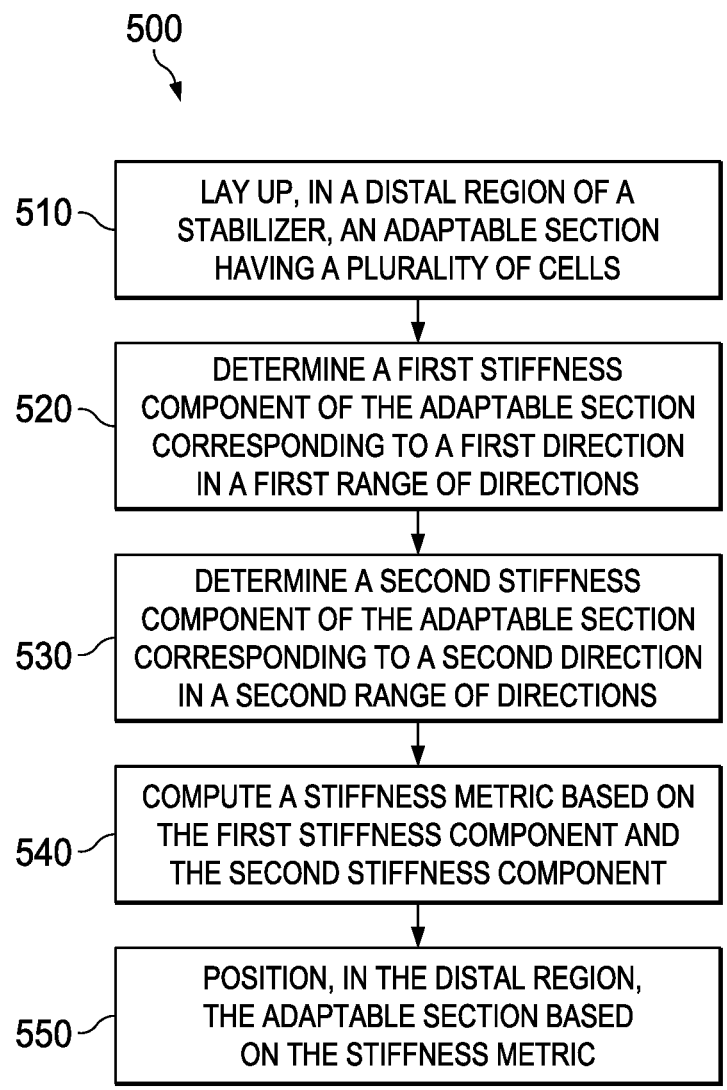
FIG. 5 is a particular illustrative aspect of methods in accordance with implementations of various techniques described herein.

Referring to FIG. 5, a method of energy attenuation 500 applicable for the above-described stabilizers 100, 300 is shown. The method 500 includes forming an energy attenuation portion 110, 310 comprising the following steps. The method 500 may be performed with any of the adaptable section 130 cell shapes described herein with reference to FIG. 4.

At step 510, the method 500 includes laying-up, in a distal region of the stabilizer, an adaptable section having a plurality of cells. For example, in certain implementations, via lay-up (e.g., composite lay-up, process to make composite by building up, placing layers of composite core material, carbon fiber, fabric layers of the plurality of cells 132 to form a stack) in a distal region (i.e., a distal end, a tip portion) of a stabilizer 100, 300, an adaptable section 130 may be formed having a plurality of carbon fiber cells 132. In some implementations, lay-up procedures may be designed and performed through computer aided design (CAD) and/or computer aided manufacturing (CAM)/additive manufacturing (AM) (i.e., 3D printing)) utilizing automated composite lay-up technologies such as automated tape lay-up (ATL) and automated fiber placement (AFP).

At step 520, the method 500 includes determining a first stiffness component of the adaptable section corresponding to a first direction in a first range of directions. For example, as discussed in above paragraphs, the first stiffness component may be determined corresponding to a first direction in a first range of directions 162 (to counteract the aerodynamic loads, such as aerodynamic load vector 150). In some implementations, computing processes, such as first stiffness component algorithms, may be automated through CAD and/or CAM/AM software.

At step 530, the method 500 includes determining a second stiffness component of the adaptable section corresponding to a second direction in a second range of directions. For example, as discussed in above paragraphs, the second stiffness component may be determined corresponding to a second direction in a second range of directions 182 (to counteract the impact load vector 170). In some implementations, computing processes, such as second stiffness component algorithms, may be automated through CAD and/or CAM/AM software.

At step 540, the method 500 includes computing a stiffness metric based on the first stiffness component and the second stiffness component. For example, as discussed in above paragraphs, the stiffness metric may be computed based on the first and second stiffness components to obtain a specific aerodynamic and/or attenuation profile. In some implementations, computing processes, such as stiffness metric algorithms, may be automated through CAD and/or CAM/AM software.

At step 550, the method 500 includes positioning, in the distal region, the adaptable section based on the stiffness metric. For example, as discussed in above paragraphs, the adaptable section 130 (including the plurality of cells therein) may be positioned based on the computed stiffness metric (to optimally orient the adaptable section 130 according to a specific aerodynamic and attenuation profile) in the distal region (on the tip) of the stabilizer. In some implementations, the adaptable section positioning process may be designed and performed through CAD and/or CAM/AM utilizing automated composite lay-up technologies such as ATP and AFP.

The method 500 may include an additional step such as: forming the energy attenuating portion 110, 310 by forming first and second edge sections 122(a,b), 124 on opposing sides of the adaptable section 130.

The method 500 may include an additional step such as: forming the energy attenuating portion 110, 310 by arranging a fiber-laid skin 140 around the energy attenuating portion 110, 310, where the fiber-laid skin 140 includes at least first and second fiber-laid skin portions 142(a,b), 144, where the first fiber-laid skin portion 142(a,b) includes one or more rigid materials, and where the second fiber-laid skin portion 144 includes one or more frangible materials.

The method 500 may include an additional step such as: arranging the fiber-laid skin 140 by arranging the first fiber laid skin portion 142(a,b) around the first and second edge sections 122(a,b), and arranging the second fiber-laid skin portion 144 at least partially around the adaptable section 130.

Each of the processes of illustrative method 500 may be performed or carried out by a system integrator, a third party, and/or an operator (e.g., an aerodynamicist or an aerospace designer). For the purposes of this description, a system integrator may include, without limitation, any number of manufacturers and major-system subcontractors; a third party may include, without limitation, any number of vendors, subcontractors, and suppliers; and an operator may be a leasing company, military entity, service organization, and so on.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Unless otherwise indicated, the terms "first", "second", etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Reference herein to "one example" means that one or more feature, structure, or characteristic described in connection with the example is included in at least one implementation. The phrase "one example" in various places in the specification may or may not be referring to the same example.

Illustrative, non-exhaustive examples, which may or may not be claimed, of the subject matter according to the present disclosure are provided below. Different examples of the device(s) and method(s) disclosed herein include a variety of components, features, and functionalities. It should be understood that the various examples of the device(s) and method(s) disclosed herein may include any of the components, features, and functionalities of any of the other examples of the device(s) and method(s) disclosed herein in any combination, and all of such possibilities are intended to be within the scope of the present disclosure. For example, a lay-up procedure of the energy attenuating portion may occur subsequent to, or concurrently with, computations of stiffness components and concurrently with a positioning of the energy attenuating portion. Many modifications of examples set forth herein will come to mind to one skilled in the art to which the present disclosure pertains having the benefit of the teachings presented in the foregoing descriptions and the associated drawings.

Therefore, it is to be understood that the present disclosure is not to be limited to the specific examples illustrated and that modifications and other examples are intended to be included within the scope of the appended claims. Moreover, although the foregoing description and the associated drawings describe examples of the present disclosure in the context of certain illustrative combinations of elements and/or functions, it should be appreciated that different combinations of elements and/or functions may be provided by alternative implementations without departing from the scope of the appended claims. Accordingly, parenthetical reference numerals in the appended claims are presented for illustrative purposes only and are not intended to limit the scope of the claimed subject matter to the specific examples provided in the present disclosure.

What is claimed is:

1. A stabilizer of an aircraft comprising:
an energy attenuating portion comprising:
first and second edge sections separated by a lattice structure, the lattice structure including, a substrate that defines a plurality of cells, each configured to attenuate energy upon deformation, and comprising one or more nodes having a first thickness to transfer aerodynamic loads, and
one or more free walls having a second thickness that is different from the first thickness to attenuate an impact load;
wherein the substrate has a first stiffness value in a first direction and a second stiffness value in a second direction, the first direction is substantially perpendicular to the second section, and the first stiffness value is different than the second stiffness value.

2. The stabilizer of claim 1, further comprising:
a fiber-laid skin comprising at least first and second skin portions,
wherein the first skin portion includes a first composite material, and the second skin includes a second composite material, and wherein the first composite material is different from the second composite material.

3. The stabilizer of claim 2, wherein the first skin portion comprises one or more materials having a third stiffness value, and wherein the second skin portion comprises one or more materials having a fourth stiffness value.

4. The stabilizer of claim 2, wherein the fiber-laid skin encloses the energy attenuating portion.

5. The stabilizer of claim 2, wherein the fiber-laid skin has a third stiffness value in the first direction and has a fourth stiffness value in the second direction.

6. The stabilizer of claim 1, wherein the plurality of cells comprise one or more cell sizes and one or more cell densities.

7. The stabilizer of claim 1, wherein each of the plurality of cells comprises the first thickness to counter aerodynamic vectors and the second thickness to counter an impact vector, wherein the first thickness is greater than the second thickness.

8. The stabilizer of claim 1, wherein the plurality of cells is configured to receive different magnitudes of energy attenuation or a single magnitude of energy attenuation.

9. The stabilizer of claim 1, wherein the first stiffness value corresponds to deformation resistance in response to a first force having a first magnitude, and wherein the second stiffness value corresponds to deformation resistance in response to a second force having a second magnitude.

10. The stabilizer of claim 1, wherein in response to an impact event, the first and second edge sections are configured to at least partially detach from the lattice structure.

11. A stabilizer of an aircraft comprising:
an energy attenuating portion comprising:
a fiber-laid skin; and
a lattice structure enclosed within the fiber-laid skin, including a substrate that defines a plurality of cells, each configured to attenuate energy upon deformation, and comprising
one or more nodes having a first thickness to transfer aerodynamic loads, and
one or more free walls having a second thickness that is different from the first thickness to attenuate an impact load;
wherein the substrate has a first stiffness value in a first direction and a second stiffness value in a second direction, the first direction is substantially perpendicular to the second section, and the first stiffness value is different than the second stiffness value.

12. The stabilizer of claim 11, wherein the fiber-laid skin comprises first and second fiber-laid skin portions, and wherein the first fiber-laid skin portion comprises one or more materials having a third stiffness value, and the second fiber-laid skin portion comprises one or more materials having a fourth stiffness value.

* * * * *